US012695151B2

(12) United States Patent
Son et al.

(10) Patent No.: US 12,695,151 B2
(45) **Date of Patent: \*Jul. 28, 2026**

(54) RECHARGEABLE BATTERY AND MANUFACTURING METHOD THEREOF

(71) Applicant: LG ENERGY SOLUTION, LTD., Seoul (KR)

(72) Inventors: Jongin Son, Daejeon (KR); Jeeeun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 567 days.

This patent is subject to a terminal disclaimer.

(21) Appl. No.: 18/037,897

(22) PCT Filed: May 9, 2022

(86) PCT No.: PCT/KR2022/006535
§ 371 (c)(1),
(2) Date: May 19, 2023

(87) PCT Pub. No.: WO2022/255673
PCT Pub. Date: Dec. 8, 2022

(65) Prior Publication Data
US 2024/0006708 A1 Jan. 4, 2024

(30) Foreign Application Priority Data
Jun. 3, 2021 (KR) ........................ 10-2021-0072370

(51) Int. Cl.
*H01M 50/342* (2021.01)
*H01M 10/04* (2006.01)
(Continued)

(52) U.S. Cl.
CPC ..... *H01M 50/3425* (2021.01); *H01M 10/049* (2013.01); *H01M 10/446* (2013.01);
(Continued)

(58) Field of Classification Search
CPC ........... H01M 50/3425; H01M 50/107; H01M 50/152; H01M 50/578; H01M 10/049; H01M 10/446
See application file for complete search history.

(56) References Cited

U.S. PATENT DOCUMENTS

2009/0274949 A1    11/2009  Meguro
2012/0219849 A1*    8/2012  Kim ..................... H01M 50/193
                                                                     429/174
(Continued)

FOREIGN PATENT DOCUMENTS

EP          3 223 333 A1      9/2017
EP          3 952 016 A1      2/2022
(Continued)

OTHER PUBLICATIONS

Extended European Search Report for European Application No. 22816332.5, dated Feb. 11, 2025.
(Continued)

*Primary Examiner* — Michael N Orlando
(74) *Attorney, Agent, or Firm* — Birch, Stewart, Kolasch & Birch, LLP

(57) ABSTRACT

A rechargeable battery includes: an electrode assembly; a battery case for receiving the electrode assembly and including an opened upper portion; and a cap assembly combined to the opened upper portion of the battery case. The cap assembly includes a safety vent, and a CID filter disposed below the safety vent. The safety vent is exposed to an outside at an upper portion, a vent hole penetrating the safety vent from top to bottom is formed, and a CID hole penetrating from top to bottom and connected to the vent hole is formed in the CID filter. A first electrode tab extending from the electrode assembly is bonded to the CID filter, and the CID hole is closed or opened by the first electrode tab.

16 Claims, 12 Drawing Sheets

100

(51) Int. Cl.
    *H01M 10/44*       (2006.01)
    *H01M 50/107*     (2021.01)
    *H01M 50/152*     (2021.01)
    *H01M 50/578*     (2021.01)

(52) U.S. Cl.
    CPC ....... *H01M 50/107* (2021.01); *H01M 50/152* (2021.01); *H01M 50/578* (2021.01)

(56)            References Cited

U.S. PATENT DOCUMENTS

| | | | |
|---|---|---|---|
| 2012/0282504 A1* | 11/2012 | Kim | H01M 50/169 |
| | | | 429/82 |
| 2017/0155105 A1 | 6/2017 | Kim et al. | |
| 2017/0279098 A1 | 9/2017 | Lee | |
| 2020/0091482 A1 | 3/2020 | Min et al. | |
| 2020/0358047 A1 | 11/2020 | Kim | |
| 2022/0102805 A1 | 3/2022 | Miyata et al. | |
| 2022/0190450 A1 | 6/2022 | Park | |
| 2022/0209342 A1 | 6/2022 | Son et al. | |
| 2023/0056045 A1 | 2/2023 | Son | |

FOREIGN PATENT DOCUMENTS

| | | | |
|---|---|---|---|
| EP | 4 102 635 A1 | 12/2022 | |
| JP | 2009-272085 A | 11/2009 | |
| JP | 2003-142060 A | 5/2023 | |
| KR | 10-20070082931 A | 8/2007 | |
| KR | 10-1396703 B1 | 5/2014 | |
| KR | 10-2017-0061423 A | 6/2017 | |
| KR | 10-1768656 B1 | 8/2017 | |
| KR | 10-2019-0011515 A | 2/2019 | |
| KR | 10-2019-0056567 A | 5/2019 | |
| KR | 10-2019-0093360 A | 8/2019 | |
| KR | 10-2020-0067896 A | 6/2020 | |
| KR | 10-2020-0141857 A | 12/2020 | |
| WO | WO 2015/146078 A1 | 10/2015 | |

OTHER PUBLICATIONS

International Search Report (PCT/ISA/210) issued in PCT/KR2022/006535, dated Aug. 29, 2022.

\* cited by examiner

【Figure 1】
CONVENTIONAL ART
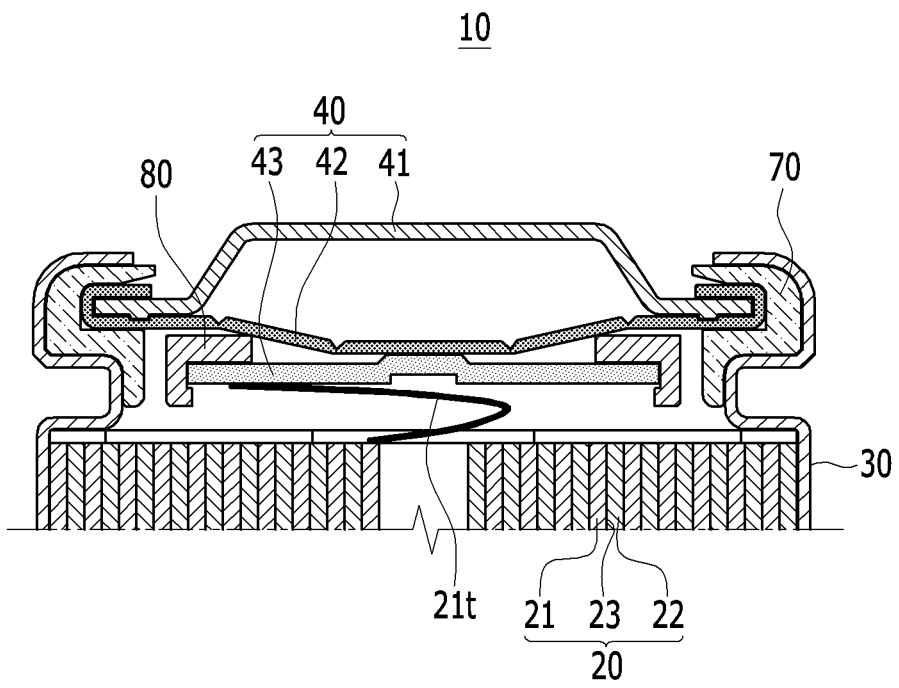

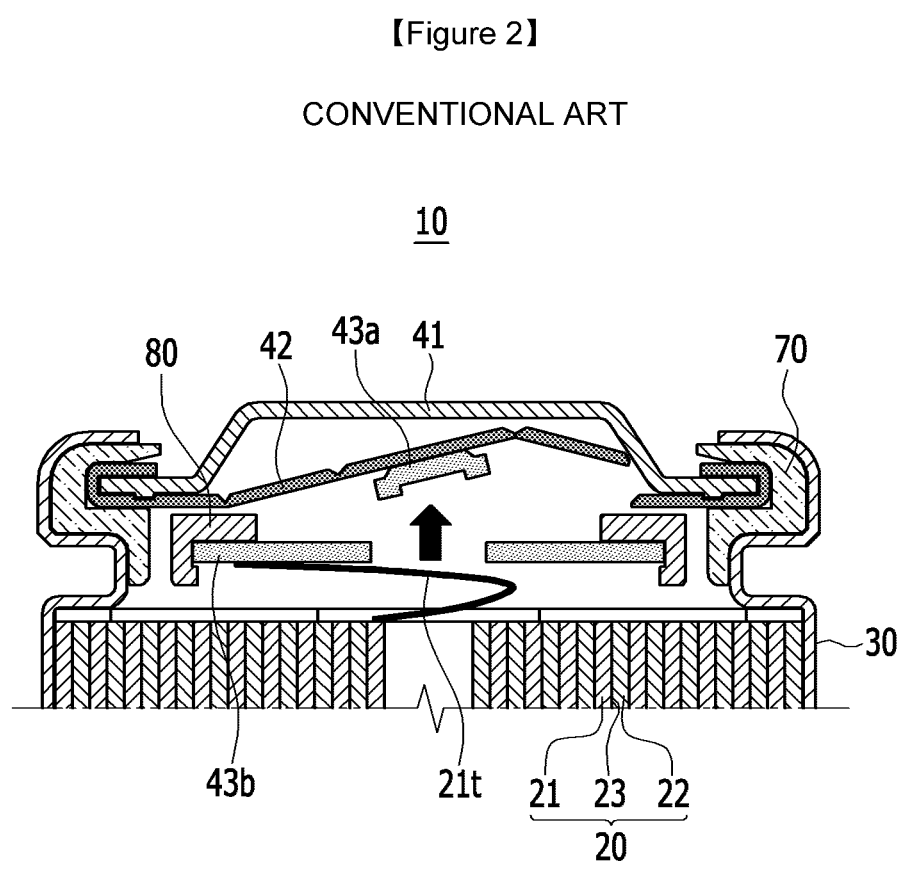

【Figure 2】

CONVENTIONAL ART

<u>10</u>

【Figure 3】
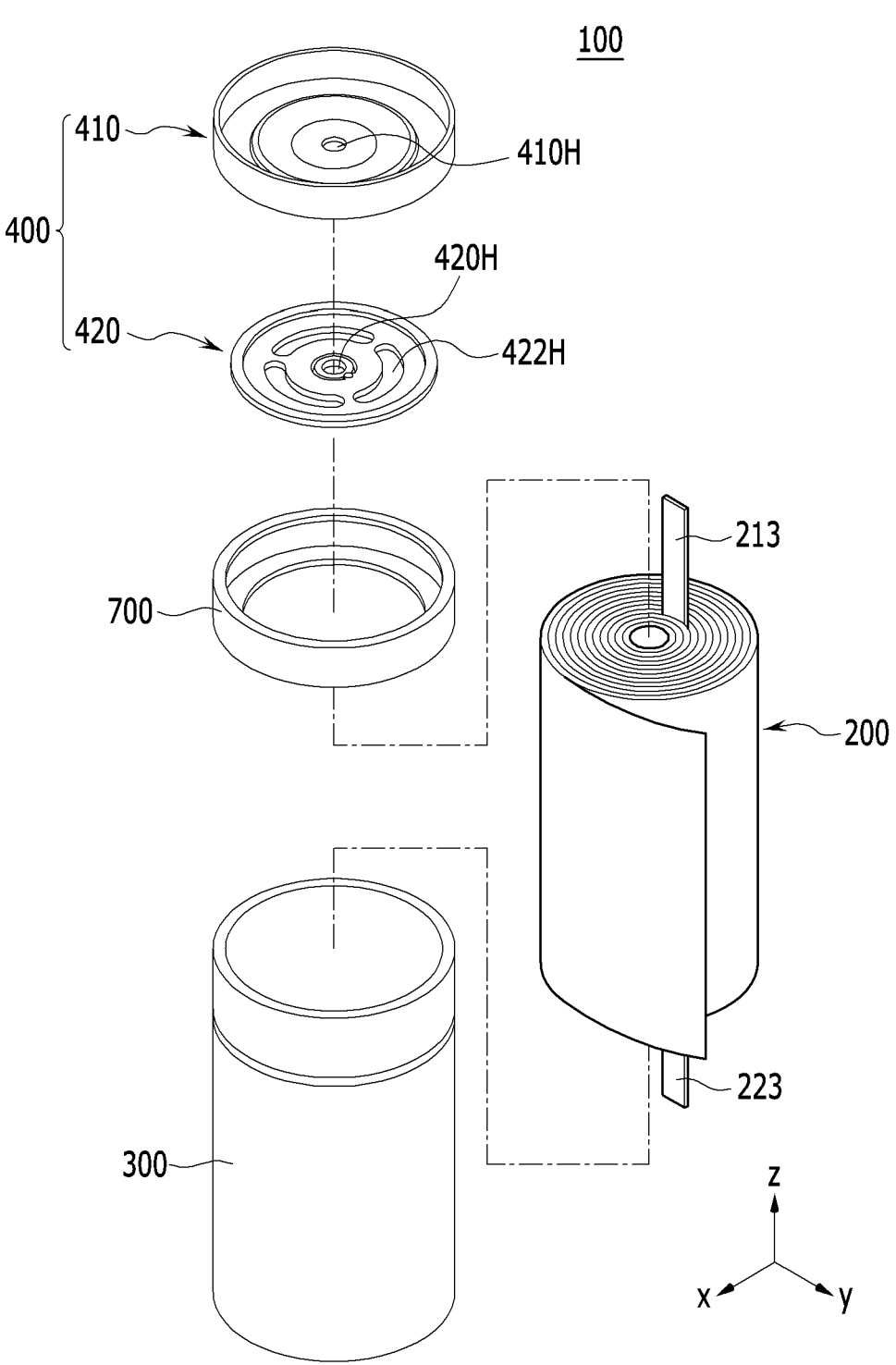

【Figure 4】
<u>410</u>
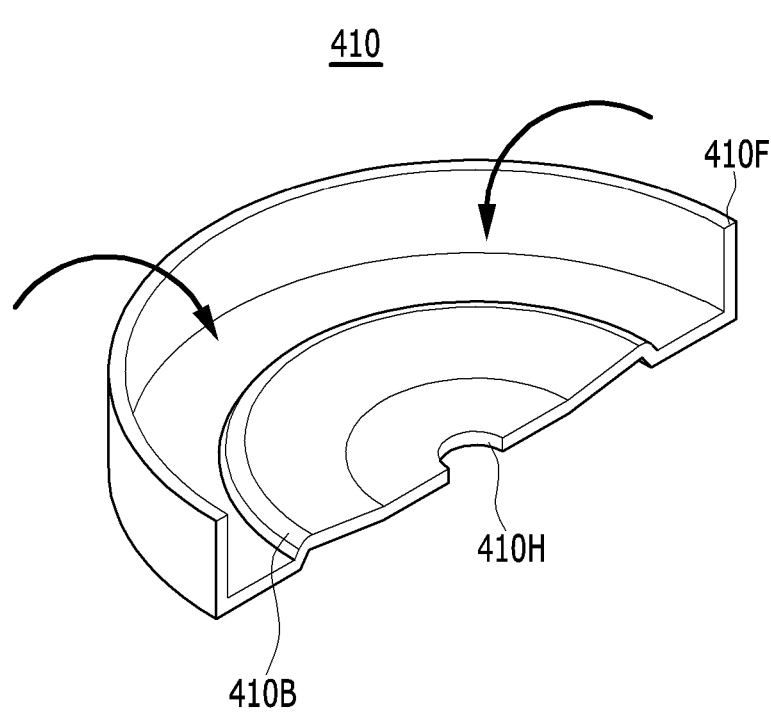

【Figure 5】
<u>100</u>
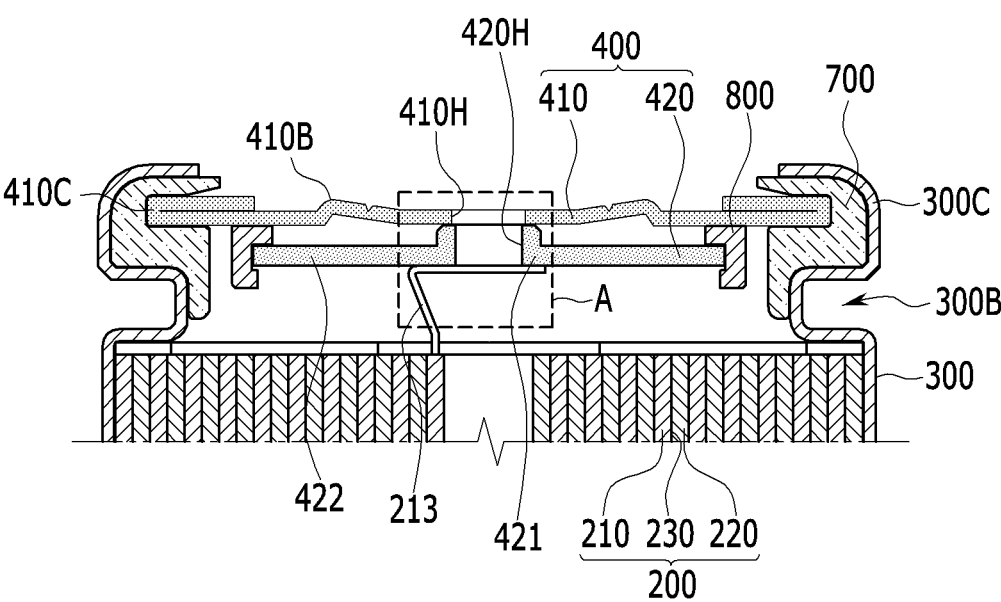

【Figure 6】
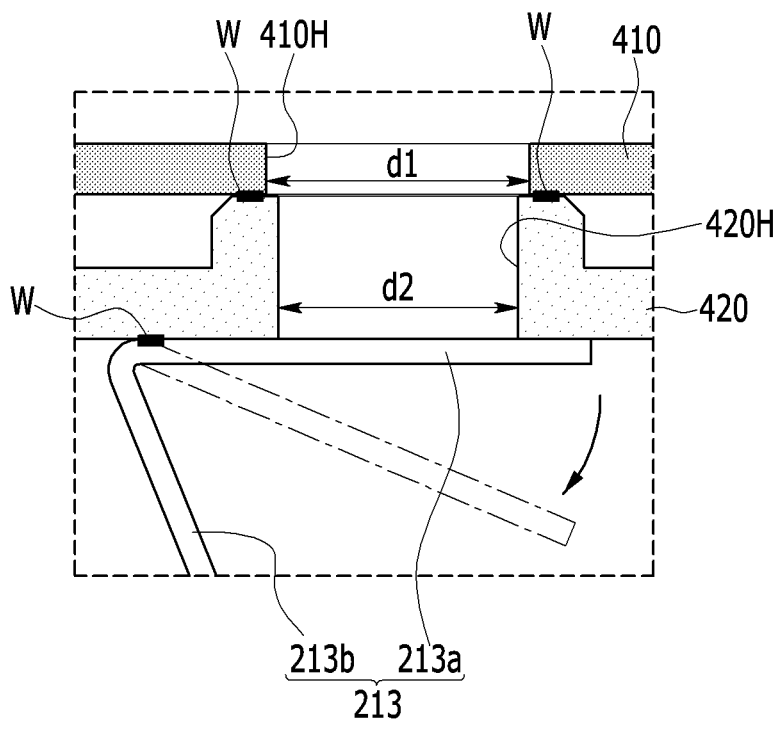
【Figure 7】
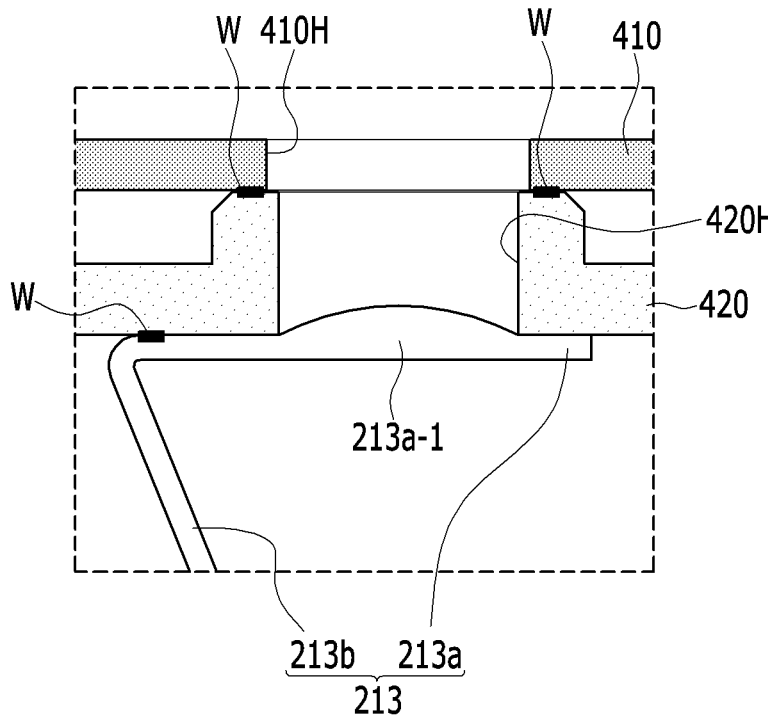

【Figure 8】
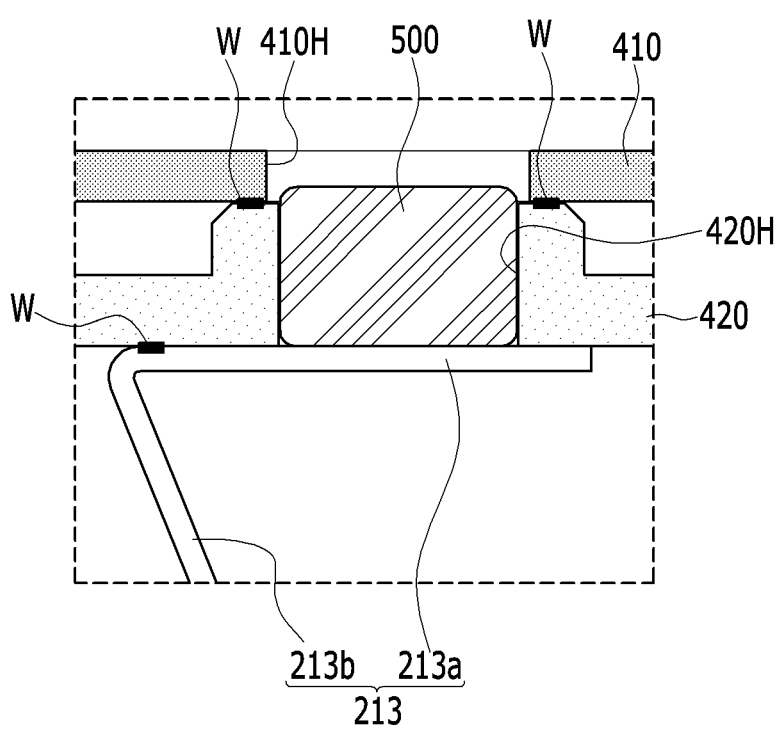
【Figure 9】
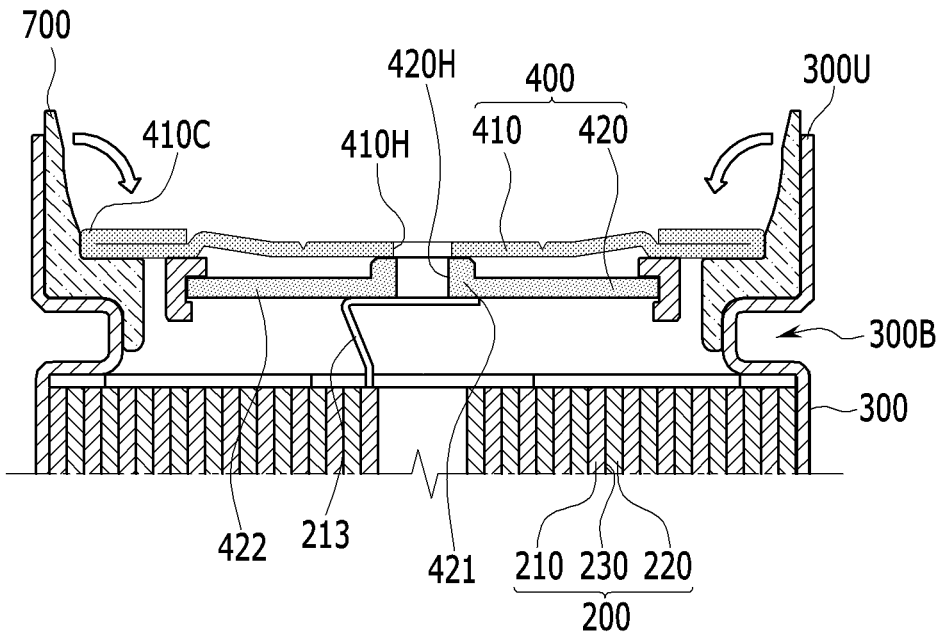

【Figure 10】
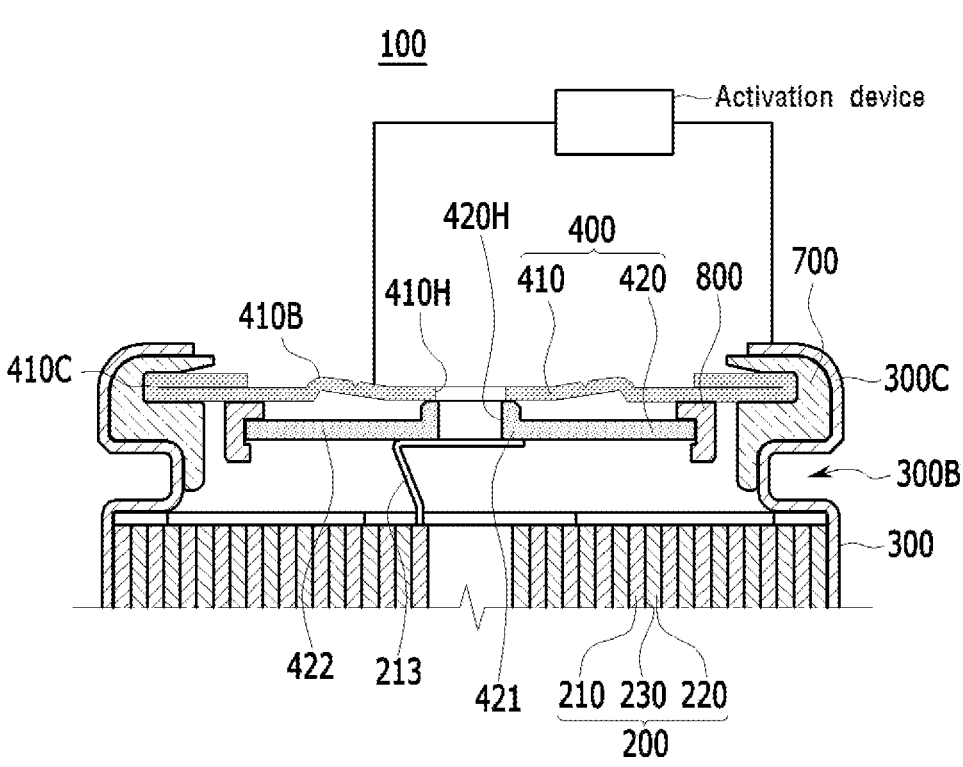

【Figure 11】
100
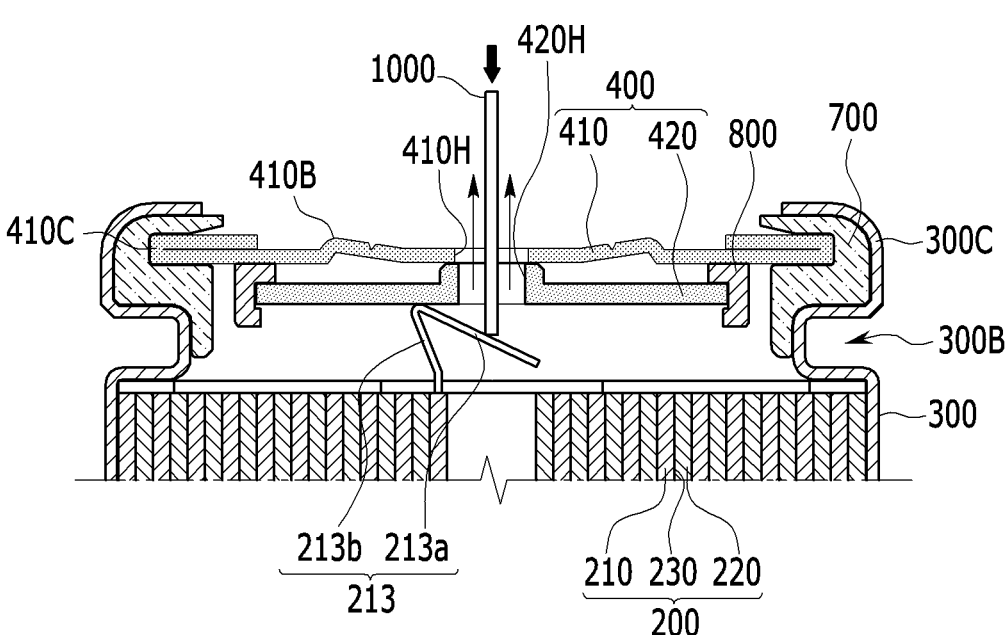

【Figure 12】
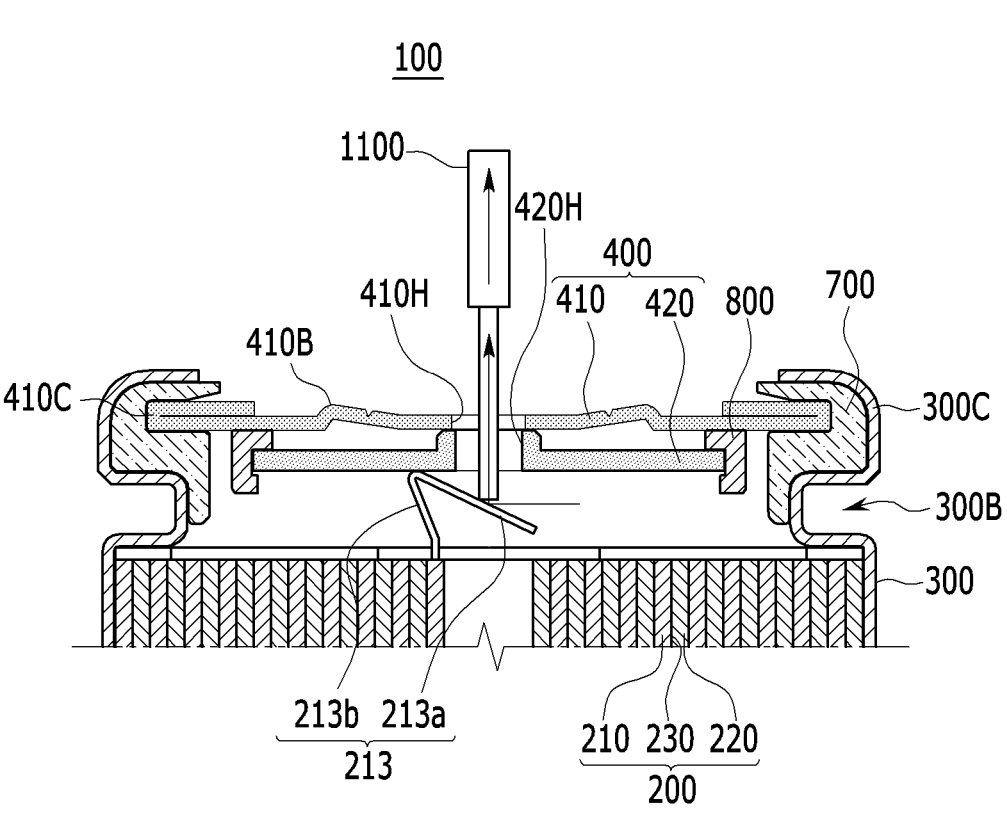

【Figure 13】
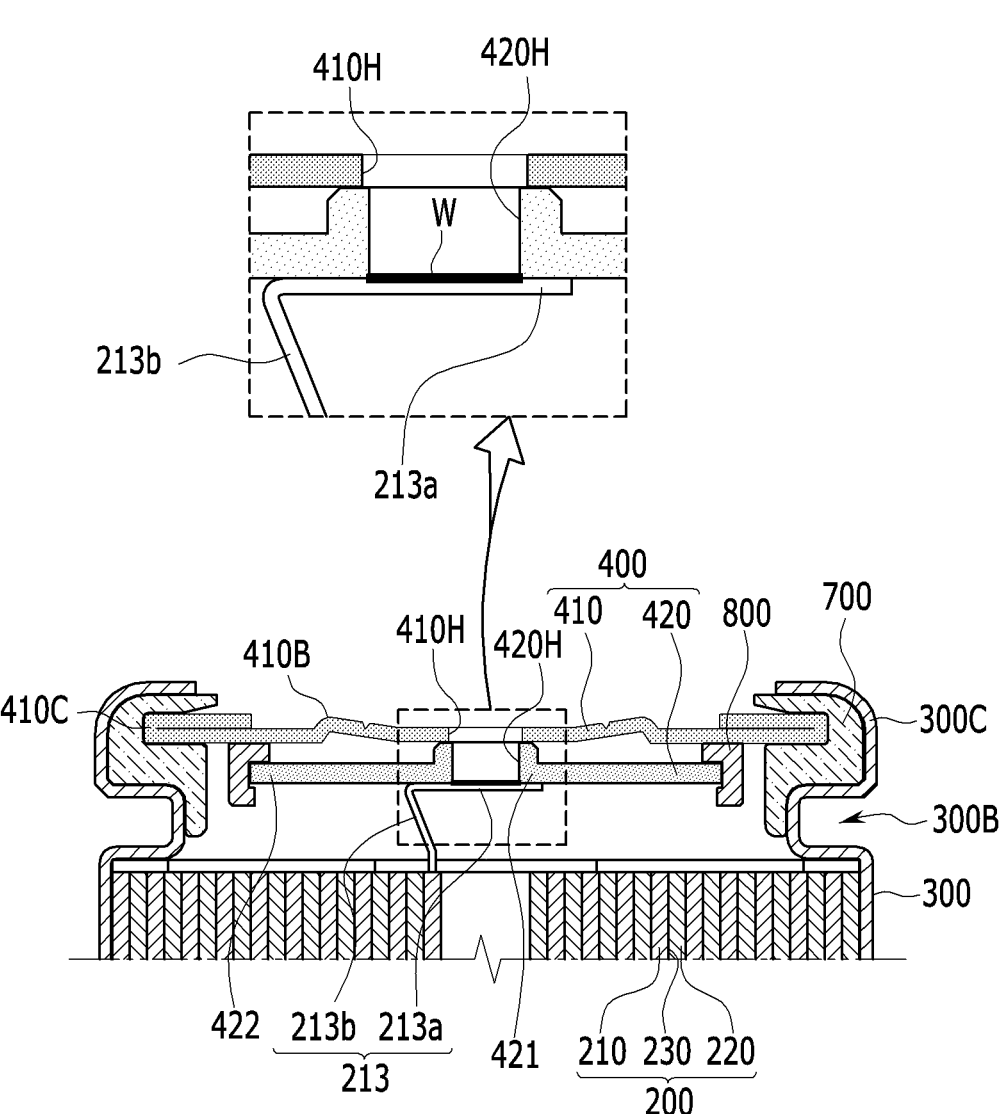

【Figure 14】
100
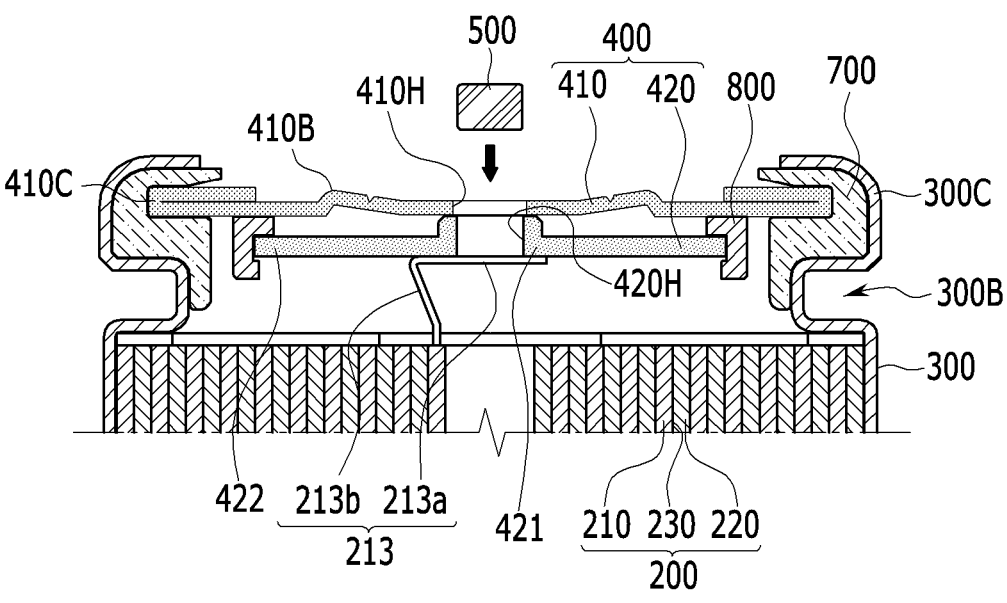
【Figure 15】
100
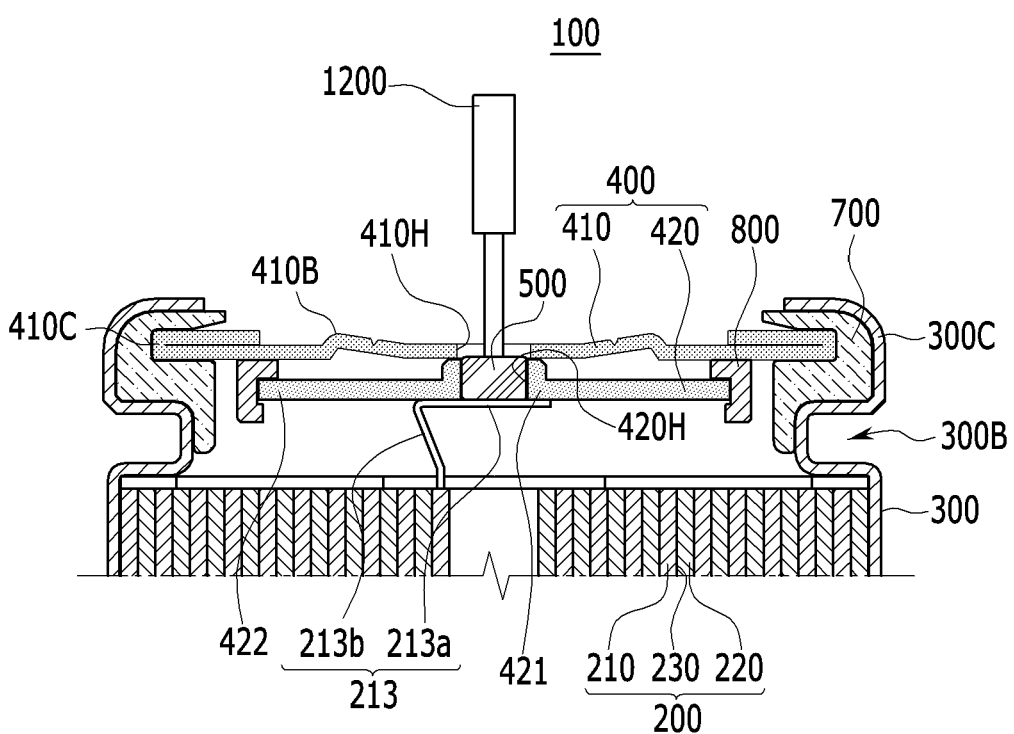

RECHARGEABLE BATTERY AND MANUFACTURING METHOD THEREOF

TECHNICAL FIELD

This application claims priority to and the benefit of Korean Patent Application No. 10-2021-0072370 filed in the Korean Intellectual Property Office on Jun. 3, 2021, the entire contents of which are incorporated herein by reference.

The present invention relates to a rechargeable battery and a manufacturing method thereof, and particularly relates to a rechargeable battery for discharging gas generated in an activation process, and a manufacturing method thereof.

BACKGROUND ART

Recently, interest in a price increase of energy sources due to depletion of fossil fuels and environmental pollution has increased, and demand for environmentally-friendly alternative energy sources has become an indispensable factor for future life. Therefore, research on various power generation technologies such as nuclear power, solar power, wind power, and tidal power has been continuously conducted, and interest in a power storing apparatus for efficiently using energy generated as described above has also increased.

Particularly, in accordance with the development of technologies for mobile devices and an increase in demand for the mobile devices, a demand for batteries as an energy source has rapidly increased. Therefore, many studies on batteries that may satisfy various needs have been conducted.

Representatively, there are high demands on lithium rechargeable batteries such as a lithium ion battery or a lithium ion polymer battery having merits including high energy density, a good discharging voltage, and output stability.

Such rechargeable batteries are classified depending on a structure of an electrode assembly in which a positive electrode, a negative electrode, and a separator interposed between the positive electrode and the negative electrode are stacked. Representative examples thereof may include a jelly-roll type (wound type) of electrode assembly in which a positive electrode and a negative electrode having a long sheet-like shape are wound with a separator interposed therebetween, a stacked type of electrode assembly in which a plurality of positive electrodes and negative electrodes that are cut in a predetermined size unit are sequentially stacked with separators interposed therebetween, and the like.

Recently, a stack/folding type of electrode assembly in which unit cells obtained by stacking positive and negative electrodes of a predetermined unit with separators interposed therebetween, which are disposed on a separation film, are sequentially wound, has been developed as an electrode assembly having an advanced structure in which the jelly-roll type and the stack type are mixed in order to solve problems of the jelly-roll types and the stack types of electrode assemblies.

In addition, depending on the shape of the case, the rechargeable battery may be classified as a cylindrical rechargeable battery in which the electrode assembly is embedded in a cylindrical case, a prismatic rechargeable battery in which the electrode assembly is embedded in a prismatic case, and a pouch-type rechargeable battery in which the electrode assembly is embedded in a pouch-type case of a laminate sheet.

Meanwhile, the rechargeable battery may be appropriately used in the market when it satisfies performance that fits the purpose of use and is simultaneously equipped with safety. When the rechargeable battery is designed, the performance and the safety are simultaneously considered to determine design factors. The designed and manufactured battery needs to estimate performance such as a lifespan, a high-rate characteristic, or a high/low temperature characteristic and estimate safety such as an overcharge, an over-discharge, impacts, a nail test, or a hot box.

From among various types of the rechargeable batteries, a cylindrical rechargeable battery may include a current interrupt device (CID) filter for blocking a current between an electrode terminal and an electrode tab and preventing an additional reaction when gas is abruptly generated in the rechargeable battery and an internal pressure increases to be greater than a predetermined level in an abnormal state such as an overcharge.

FIG. 1 shows a partial cross-sectional view of a conventional cylindrical rechargeable battery.

Referring to FIG. 1, an electrode assembly 20 may be received in a cylindrical case 30, and a cap assembly 40 may be mounted on an opened upper portion of the cylindrical case 30 to thus manufacture a cylindrical rechargeable battery 10.

The electrode assembly 20 may be a jelly-roll type electrode assembly in which a first electrode 21, a second electrode 22, and a separation membrane 23 are wound.

The cap assembly 40 may include an upper cap 41, a safety vent 42 for descending an internal pressure, and a current interrupt device (CID) filter 43. The upper cap 41 and the safety vent 42 may be closely attached to each other, and the safety vent 42 may be connected to a center of the CID filter 43. A first electrode tab 21t protruding from the first electrode 21 may be connected to a lower end of the CID filter 43. Here, the first electrode 21 may be a positive electrode, and the first electrode tab 21t may be a positive electrode tab.

As described above, the upper cap 41 may be directly/indirectly connected to the safety vent 42, the CID filter 43, and the first electrode tabs 21t to be thus electrically connected to the electrode assembly 20, and may function as an electrode terminal.

In addition, a gasket 70 for a sealing between the cap assembly 40 and the cylindrical case 30 and a CID gasket 80 for wrapping an edge of the CID filter 43 may be disposed.

FIG. 2 shows a partial cross-sectional view when an internal pressure of a cylindrical rechargeable battery of FIG. 1 increases.

Referring to FIG. 2, when the cylindrical rechargeable battery 10 is exposed to a high temperature condition or enters an abnormal operation state to thus increase the internal pressure, a shape of the safety vent 42 is reversed and the CID filter 43 is separated to block the current. In detail, the CID filter 43 is divided into a portion 43a connected to the safety vent 42 and a portion 43b connected to the first electrode tab 21t, and a flow of current between the upper cap 41 functioning as an electrode terminal and the first electrode tab 21t is blocked. Also, when the internal pressure substantially increases, a notch portion of the safety vent 42 is broken, the safety vent 42 is opened, and internal gas is discharged.

When the upper cap 41 is furnished in a like way of the conventional cylindrical rechargeable battery 10, its structural rigidity is excellent, but when the safety vent 42 is opened and the internal gas is discharged, a spatial portion is inferior by the upper cap 41, the safety vent 42 is not fully opened, and the gas discharging is limited. Further, the CID filter 43 may not be clearly separated, and the current may continuously flow in the abnormal operation state.

In general, a lithium rechargeable battery undergoes a formation process, that is, an activation process for the manufacturing process. The activation process represents a process for assembling a battery and performing charging and discharging to activate the battery, so at the time of charging, lithium ions provided from the positive electrode move to a negative electrode and are inserted into the same, and in this instance, a solid electrolyte interface (SEI) film is formed on the surface of the negative electrode. The activation process is generally progressed as repeating the charging and discharging with a constant current or a constant voltage within a predetermined range.

Regarding the activation process, a large amount of gas is generated according to formation of an electrode film or decomposition of moisture in the cell, and the gas generated for the activation process is a large amount and continuously reacts with the electrode film, so a process for discharging it is needed. This is referred to as a degas process.

However, referring to FIG. 1 and FIG. 2, the conventional cylindrical rechargeable battery 10 has to maintain a sealing state after an electrolyte solution is injected, so it is not easy to discharge the gas generated for the activation process. When the gas generated in the activation process is not discharged, a battery reaction between the positive electrode and the negative electrode is hindered, and bad influences may be given to initial capacity of the battery, stable formation of the solid electrolyte interface (SEI), and a lifespan performance realization characteristic. Further, the gas fails to be discharged, which gives an influence to results of estimation of the safety.

As a result, the cylindrical rechargeable battery for discharging gas generated in the activation process is needed to be developed.

DETAILED DESCRIPTION OF THE INVENTION

Technical Problem

The present invention has been made in an effort to provide a rechargeable battery for discharging gas after an activation process, and a manufacturing method thereof.

However, tasks to be solved by embodiments of the present invention may not be limited to the above-described task and may be extended in various ways within a range of technical scopes included in the present invention.

Technical Solution

An embodiment of the present invention provides a rechargeable battery including: an electrode assembly having a first electrode tab extending therefrom; a battery case configured to receive the electrode assembly therein, the battery case having an opened upper portion; and a cap assembly connected to the opened upper portion of the battery case. The cap assembly includes a safety vent exposed to an outside of the rechargeable battery at the opened upper portion of the battery case, the safety vent a vent hole; and current interrupt device (CID) filter located below the safety vent, the CID filter having a CID hole. The first electrode tab is connected to the CID filter, and the CID hole is closed or opened by movement of the first electrode tab.

The vent hole and the CID hole may be disposed on a same line, and, when the first electrode tab closes the CID hole, the first electrode tab may be exposed to the outside of the rechargeable battery through the vent hole and the CID hole.

The vent hole may have a diameter that is greater than a diameter of the CID hole.

The first electrode tab may include an upper tab portion and a lower tab portion connected to the upper tab portion. The lower tab portion may be connected to the electrode assembly, and a first end of the upper tab portion connected to the lower tab portion may be connected to the CID filter.

A second end of the upper tab portion may be in contact with or spaced from a lower side of the CID filter to close or open the CID hole.

The first electrode tab may include a material with an elastic restoration force.

A lower portion of an interior circumference of the CID hole may be welded to the upper tab portion.

The first electrode tab may include a protrusion inserted into the CID hole.

The rechargeable battery may further include a sealing ball inserted into the CID hole.

One end of the opened upper portion of the battery case may be bent to wrap an exterior circumference of the safety vent to form a crimping portion.

Another embodiment of the present invention provides a method for manufacturing a rechargeable battery, including: receiving an electrode assembly into a battery case with an opened upper portion of the battery case, the electrode assembly having a first electrode tab extending therefrom; combining a cap assembly having a safety vent and a CID filter to the opened upper portion of the battery case; activating the electrode assembly; and discharging gas by the activating the electrode assembly to an outside of the rechargeable battery through a vent hole in the safety vent and a CID hole in the CID filter. The safety vent is exposed to the outside of the rechargeable battery at the opened upper portion of the battery case. The first electrode tab is connected to the CID filter while the CID hole is closed by the first electrode tab. During the discharging the gas, the first electrode tab may be pressed downward via the vent hole and the CID hole to open the CID hole so the gas may be discharged to the outside of the rechargeable battery through the CID hole and the vent hole.

During the discharging the gas, a bar member or a suction device may be inserted through the vent hole and the CID hole to press the first electrode tab downward.

After the discharging the gas, a force pressing the first electrode tab may be removed, and the first electrode tab may be returned to an original position to close the CID hole again.

The method may further include, after the discharging the gas, welding a lower portion of the interior circumference of the CID hole and the first electrode tab.

The method may further include, after the discharging the gas, inserting a sealing ball into the CID hole through the vent hole to seal the CID hole.

The method may further include fusing the sealing ball inserted into the CID hole.

Advantageous Effects

According to the embodiments of the present invention, the upper cap is removed, and the safety vent is exposed to the outside to remove the spatial limit on the safety vent so the safety vent may be completely opened when the internal pressure increases, and the gas may be efficiently discharged.

Further, as the safety vent is exposed to the outside, the gas generated in the activation process may be easily discharged by forming an additional vent hole in the safety vent. Hence, the problem of expansion or transformation of the electrode assembly according to gas or the problem of causing precipitation of lithium according to remaining gas foam may be solved.

The effects of the present invention are not limited to the effects mentioned above, and other effects not mentioned can be clearly understood by those skilled in the art from the description of the claims.

DESCRIPTION OF THE DRAWINGS

FIG. 1 shows a partial cross-sectional view of a conventional cylindrical rechargeable battery.

FIG. 2 shows a partial cross-sectional view when an internal pressure of a cylindrical rechargeable battery of FIG. 1 increases.

FIG. 3 shows an exploded perspective view of a rechargeable battery according to an embodiment of the present invention.

FIG. 4 shows a cross-section perspective view of a safety vent included in a rechargeable battery of FIG. 3.

FIG. 5 shows a cross-sectional view of an upper portion of a rechargeable battery according to an embodiment of the present invention.

FIG. 6 shows an enlarged portion "A" of FIG. 5.

FIG. 7 shows a first electrode tab on which a protrusion is formed according to a modified embodiment of the present invention.

FIG. 8 shows a sealing ball inserted into a CID hole according to an embodiment of the present invention.

FIG. 9 to FIG. 15 show cross-sectional views of a method for manufacturing a rechargeable battery according to an embodiment of the present invention.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Parts that are irrelevant to the description will be omitted to clearly describe the present invention, and the same elements will be designated by the same reference numerals throughout the specification.

The size and thickness of each configuration shown in the drawings are arbitrarily shown for better understanding and ease of description, but the present invention is not limited thereto. In the drawings, the thickness of layers, films, panels, regions, etc., are enlarged for clarity. The thicknesses of some layers and areas are exaggerated for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise", and variations such as "comprises" or "comprising", will be understood to imply the inclusion of stated elements but not the exclusion of any other elements.

The phrase "in a plan view" means viewing an object portion from the top, and the phrase "in a cross-sectional view" means viewing a cross-section of which the object portion is perpendicularly cut from the side.

FIG. 3 shows an exploded perspective view of a rechargeable battery according to an embodiment of the present invention. FIG. 4 shows a cross-section perspective view of a safety vent included in a rechargeable battery of FIG. 3. FIG. 5 shows a cross-sectional view of an upper portion of a rechargeable battery according to an embodiment of the present invention. Particularly, FIG. 5 shows a cross-sectional view of an upper portion of a cross-section with respect to an xz-plane when respective parts of a rechargeable battery shown in FIG. 3 are assembled.

Referring to FIG. 3 to FIG. 5, the rechargeable battery 100 includes an electrode assembly 200, a battery case 300 for receiving the electrode assembly 200 and including an opened upper portion, and cap assembly 400 combined to the opened upper portion of the battery case 300.

The electrode assembly 200 may include a first electrode 210, a second electrode 220, and a separation membrane 230. The first electrode 210, the second electrode 220, and the separation membrane 230 may be wound with each other to form a jelly-roll type electrode assembly 200. The separation membrane 230 may be provided between the first electrode 210 and the second electrode 220.

Although not shown in detail, the first electrode 210 may be formed by applying an electrode active material on the first electrode current collector. A first electrode tab 213 may be attached to a portion to which no electrode active material is applied from among the first electrode current collector and on which the first electrode current collector is exposed according to a method such as welding.

The second electrode 220 may be formed by applying the electrode active material to the second electrode current collector. Further, a second electrode tab 223 may be attached to a portion to which no electrode active material is applied from among the second electrode current collector and on which the second electrode current collector is exposed according to a method such as welding.

In this, the first electrode 210 may be a positive electrode and the second electrode 220 may be a negative electrode. Accordingly, the first electrode tab 213 may be a positive electrode tab and the second electrode tab 223 may be a negative electrode tab. Further, regarding the wound electrode assembly 200, the first electrode tab 213 and the second electrode tab 223 may protrude in opposite directions. As shown in FIG. 3, the first electrode tab 213 may protrude in a direction (z-axis direction) in which the cap assembly 400 is positioned, and the second electrode tab 223 may protrude in a direction (−z-axis direction) in which a bottom of the battery case 300 is positioned. The first electrode tab 213 may be connected to the cap assembly 400, and the second electrode tab 223 may be connected to the bottom of the battery case 300. That is, the cap assembly 400 and the battery case 300 may respectively function as an electrode terminal of the rechargeable battery 100.

The battery case 300 may receive the electrode assembly 200 into which an electrolyte solution is impregnated, may include a metal material, and may be a cylindrical case.

The cap assembly 400 includes a safety vent 410 and a current interrupt device (CID) filter 420 positioned below the safety vent 410. The safety vent 410 is exposed to the outside at the upper portion. A vent hole 410H is formed in the safety vent 410 to penetrate from top to bottom, and a CID hole 420H penetrating the CID filter 420 from top to bottom and connected to the vent hole 410H is formed. Here, that the vent hole 410H is connected to the CID hole 420H signifies that spaces in the holes are connected to each other.

Regarding the cap assembly 400 from which the upper cap is removed, differing from the conventional cylindrical rechargeable battery 10 (refer to FIG. 1), the safety vent 410 is exposed to the outside at the upper portion.

The safety vent 410 may be positioned on the CID filter 420, and may be electrically connected to the CID filter 420. In detail, a center portion of the safety vent 410 excluding the vent hole 410H may be physically and electrically connected to a first portion 421 of the CID filter 420 excluding the CID hole 420H. The first electrode tab 213 extending from the electrode assembly 200 is bonded to the CID filter 420. In detail, the first electrode tab 213 protruding from the first electrode 210 may be bonded to the lower end of the CID filter 420.

The safety vent 410 is a thin-film structure through which the current flows, and it may be a circular-disk plate. The safety vent 410, the CID filter 420, and the first electrode tabs 213 are sequentially connected, and the safety vent 410 may function as an electrode terminal for guiding an electrical connection of the electrode assembly 200.

The CID filter 420 is a plate member through which the current flows, and outlets 422H for discharging gas may be formed therein. Further, the CID filter 420 may include a first portion 421 connected to the safety vent 410 and a second portion 422 connected to the first electrode tab 213, the first portion 421 may be positioned on a center portion of the CID filter 420, and the second portion 422 may be positioned on an exterior circumference of the CID filter 420. A CID gasket 800 for wrapping an edge of the CID filter 420 may be disposed.

When the internal pressure of the rechargeable battery 100 increases, a shape of the safety vent 410 may be reversed. As the shape of the safety vent 410 is reversed, the first portion 421 of the CID filter 420 is also lifted so the first portion 421 and the second portion 422 of the CID filter 420 may be separated from each other. To induce the separation according to the increase of the internal pressure, an interval between the first portion 421 and the second portion 422 may be designed to have a slightly weak rigidity. By the separation of the first portion 421 and the second portion 422, the current flowing between the safety vent 410 and the first electrode tab 213 is blocked.

Further, as shown in FIG. 5, a notch structure such as a groove may be provided to the safety vent 410. As the internal pressure increases, the notch structure is broken or torn down to open the safety vent 410 and the internal gas is then discharged. In the case of the conventional cylindrical rechargeable battery 10 (refer to FIG. 1), the upper cap 41 is positioned on the safety vent 42 so the spatial portion is inferior and the safety vent 42 is not completely opened. Hence, the gas is not efficiently discharged. The upper cap 41 may be a hindrance to gas discharging. Differing from this, regarding the rechargeable battery 100 according to the present embodiment, the safety vent 410 is exposed to the outside at the upper portion without the upper cap so the shape of the safety vent 410 may be freely reversed or separated when the internal pressure increases. Therefore, compared to the conventional cylindrical rechargeable battery 10, the rechargeable battery 100 is further efficient in the gas discharging, and the current may be more clearly blocked according to the separation of the first portion 421 and the second portion 422 in the abnormal operation state.

Configurations of the vent hole 410H, the CID hole 420H, and the first electrode tab 213 according to the present embodiment will now be described in detail.

FIG. 6 shows an enlarged portion "A" of FIG. 5.

Referring to FIG. 5 and FIG. 6, as described above, the first electrode tab 213 extending from the electrode assembly 200 is bonded to the CID filter 420. The CID hole 420H is closed or opened by the first electrode tab 213.

The vent hole 410H is connected to the CID hole 420H. Particularly, the safety vent 410 may be combined to the CID filter 420, and the vent hole 410H may be connected to the CID hole 420H on a portion on which the safety vent 410 is combined to the CID filter 420. In further detail, the CID hole 420H may be formed on the first portion 421 connected to the safety vent 410 from among the CID filter 420.

In detail, the CID hole 420H is closed when the first electrode tab 213 is closely attached to the CID filter 420, and the CID hole 420H is opened when the first electrode tab 213 is spaced from the CID filter 420.

To be described later, a long bar may be disposed to penetrate the vent hole 410H of the safety vent 410 and the CID hole 420H of the CID filter 420, and the first electrode tab 213 having closed the CID hole 420H may be pressed downward. The CID hole 420H is then opened, and the gas generated in the activation process to be described may be discharged to the outside through the CID hole 420H and the vent hole 410H. Therefore, the problem of expansion or transformation of the electrode assembly according to remaining gas or the problem of causing precipitation of lithium according to remaining gas may be solved.

Further, as the upper cap is removed from the rechargeable battery 100, the long bar may easily penetrate the vent hole 410H and the CID hole 420H. In other words, the bar may be inserted to press the first electrode tab 213 without damaging the vent hole 410H and the CID hole 420H.

The rechargeable battery 100 may stably perform charging and discharging in the activation process as the CID hole 420H is closed by the first electrode tab 213. The internal gas may be discharged to the outside through the opened CID hole 420H by pressing the first electrode tab 213 downward after the activation process. When the gas discharging ends, the first electrode tab 213 and the CID hole 420H are welded to be sealed, thereby preventing leakage of the electrolyte solution. The above-noted manufacturing process will be described in detail with reference to FIG. 9 to FIG. 15.

The vent hole 410H and the CID hole 420H may have a minimum diameter by which the bar may be inserted. For example, the vent hole 410H and the CID hole 420H may have the diameter of 1 to 3 mm, and hence, the gas in the battery case 300 may be discharged to the outside, and inflow of foreign materials through the vent hole 410H and the CID hole 420H may be prevented.

The vent hole 410H and the CID hole 420H may be positioned on a same perpendicular line. The vent hole 410H and the CID hole 420H may be disposed in a top-to-bottom direction and may be positioned on the same perpendicular line. The first electrode tab 213 blocking the CID hole 420H may be visible from the outside through the vent hole 410H and the CID hole 420H. As a result, it may be easily found from the outside of the rechargeable battery 100 whether the CID hole 420H is finished. As the upper cap is removed from the rechargeable battery 100, it may be further easily found whether the CID hole 420H is finished.

As the vent hole 410H and the CID hole 420H are positioned on a straight line, the CID hole 420H may be opened by efficiently pressing the first electrode tab 213. The vent hole 410H may be formed on a center point of the safety vent 410 and the CID hole 420H may be formed on a center point of the CID filter 420, to thus minimize weakening of the rigidity.

As another embodiment of the present invention, part of the vent hole 410H and the CID hole 420H may be positioned on the same perpendicular line. For example, the half of the vent hole 410H and the CID hole 420H may be positioned on the same perpendicular line, and the other half thereof may be positioned on different perpendicular lines. Accordingly, inflows of unnecessary substances or foreign materials into the vent hole 410H and the CID hole 420H may be prevented, and the first electrode tab 213 may be prevented from being pressed because of the unneeded substances.

The diameter d1 of the vent hole 410H may be greater than the diameter d2 of the CID hole 420H. When a long bar for pressing the first electrode tab 213 is inserted into the vent hole 410H, it may not be easy to insert the same because of a flow phenomenon of the bar. The vent hole 410H may have a greater diameter than that of the CID hole 420H to thus allow the bar to easily penetrate. Particularly, the vent hole 410H may be prevented from being damaged by the bar pressing the first electrode tab 213. As described above, the shape of the safety vent 410 must be reversed or separated so as to prevent explosion of the rechargeable battery 100, and defects may be generated because of damage of the vent hole 410H and its peripheral portions. To prevent this, the diameter of the vent hole 410H may be greater than the diameter of the CID hole 420H. For example, the diameter of the vent hole 410H may be 3 mm, and the diameter of the CID hole 420H may be 2 mm.

As described above, the safety vent 410 is combined to the CID filter 420, and the vent hole 410H may be connected to the CID hole 420H at the portion on which the safety vent 410 is combined to the CID filter 420. Particularly, an external circumferential surface of the vent hole 410H may be bonded to an external circumferential surface of the CID hole 420H. In detail, a lower external circumferential surface of the vent hole 410H may be welded and bonded to an upper external circumferential surface of the CID hole 420H to form a bonded portion W. That is, the safety vent 410 may be bonded to the CID filter 420 to be sealed with each other, and inflows of foreign materials or leakages of the electrolyte solution to the vent hole 410H and the CID hole 420H through the safety vent 410 and the CID filter 420 may be prevented.

The first electrode tab 213 may include an upper tab portion 213*a* and a lower tab portion 213*b*. The lower tab portion 213*b* may be connected to the electrode assembly 200. That is, the lower tab portion 213*b* may extend from the electrode assembly 200.

A first end of the upper tab portion 213*a* connected to the lower tab portion 213*b* may be bonded to the CID filter 420. Particularly, the first end of the upper tab portion 213*a* may be welded and bonded to a lower side of the CID filter 420 to thus form a bonded portion W.

A second end of the upper tab portion 213*a* may be closely attached to/spaced from the lower side of the CID filter 420, and may close/open the CID hole 420H. In detail, when the upper tab portion 213*a* closing the CID hole 420H is pressed with a bar to be described, the second end of the upper tab portion 213*a* is spaced from the CID filter 420 and the CID hole 420H is opened. When a force having pressed the second end of the upper tab portion 213*a* is removed, the second end of the upper tab portion 213*a* is closely attached to the CID filter 420 by an elastic restoration force of the upper tab portion 213*a* and closes the CID hole 420H.

According to this, the first electrode tab 213 may stably seal the CID hole 420H for the activation process of the rechargeable battery 100, and it may be spaced from the CID filter 420 to open the CID hole 420H and discharge the gas after the activation process.

The first electrode tab 213 may include a material with an elastic restoration force, and the second end of the upper tab portion 213*a* may be elastically closely attached to the CID filter 420. When the external force having pressed the second end of the upper tab portion 213*a* is removed, the second end of the upper tab portion 213*a* is quickly returned to an original position by the elastic restoration force, thereby quickly and stably closing the CID hole 420H. The first electrode tab 213 may be an alloy steel including a material with the elastic restoration force.

After the gas is discharged, a lower portion of an interior circumference of the CID hole 420H may be welded and bonded to the upper tab portion 213*a* of the first electrode tab 213. That is, the second end of the upper tab portion 213*a* closely attached to the lower side of the CID filter 420 is bonded to the CID filter 420 after the gas is discharged, and the CID hole 420H is completely sealed. As a result, the inflow of foreign materials or the leakage of the electrolyte solution may be prevented after the gas is discharged.

FIG. 7 shows a first electrode tab on which a protrusion is formed according to a modified embodiment of the present invention.

Referring to FIG. 7, the first electrode tab 213 according to a modified embodiment may include a protrusion 213*a*-1 inserted into the CID hole 420H. In detail, as described above, the first electrode tab 213 may include the upper tab portion 213*a* and the lower tab portion 213*b*, and a protruding protrusion 213*a*-1 may be formed on the upper tab portion 213*a*.

The protrusion 213*a*-1 increases a sealing force between the first electrode tab 213 and the CID hole 420H, and it may have the same diameter as the diameter of the CID hole 420H. The protrusion 213*a*-1 is inserted into the CID hole 420H and increases the sealing force between the first electrode tab 213 and the CID hole 420H. Particularly, the protrusion 213*a*-1 is formed to have a hemispherical uplifted structure so the protrusion 213*a*-1 may be easily combined to/separated from the CID hole 420H.

FIG. 8 shows a sealing ball inserted into a CID hole according to an embodiment of the present invention.

Referring to FIG. 5, FIG. 6, and FIG. 8, the rechargeable battery 100 according to the present embodiment may further include a sealing ball 500 inserted into the CID hole 420H. When the discharging of the gas generated after the activation process ends, the sealing ball 500 may be inserted into the CID hole 420H. The sealing ball 500 seals the CID hole 420H, it has a cylindrical or spherical shape, and it is inserted into the CID hole 420H through the vent hole 410H and seals the CID hole 420H.

In this instance, the cylindrical or spherical sealing ball 500 may be bonded to the CID hole 420H by ball welding. The ball welding represents a bonding method for blocking a hole by shooting a ball-shaped element to the hole with a diameter that is less than the ball. That is, the diameter of the sealing ball 500 before filled into the CID hole 420H may be greater than an internal diameter of the CID hole 420H. The CID hole 420H may be blocked by strongly shooting the sealing ball 500 and forcibly inserting the same into the CID hole 420H. FIG. 8 shows a state in which the sealing ball 500 is inserted and bonded to the CID hole 420H by the ball welding.

The sealing ball 500 may also be inserted into the CID hole 420H, and may be fused by a thermal fusing device (not shown). Accordingly, the sealing ball 500 is bonded to the interior circumference of the CID hole 420H, and the sealing force between the CID hole 420H and the sealing ball 500 may be increased.

In this instance, as the safety vent 410 is exposed to the outside when the upper cap is removed, the CID hole 420H is easily sealed. The conventional cylindrical rechargeable battery 10 (refer to FIG. 1) has the upper cap 41 when the CID hole is formed, so it is substantially difficult to block the CID hole again after the gas is discharged. Holes must be formed in the upper cap 41 and the safety vent 42 to discharge gas, and it is complicated and difficult to block the holes formed in the safety vent 42 and the CID filter 43 because there is the upper cap 41. Differing from this, regarding the cap assembly 400, the safety vent 410 is exposed on the uppermost portion so it is easy to seal the CID hole 420H by using a method for performing welding and bonding between the lower portion of the interior circumference of the CID hole 420H and the upper tab portion 213a or inserting the sealing ball 500 after discharging gas.

Referring to FIG. 3 to FIG. 5, the battery case 300 may include a crimping portion 300C and a beading portion 300B. The beading portion 300B indicates a portion of the cylindrical battery case 300 indented in a center direction of the electrode assembly 200, and prevents flowing of the electrode assembly 200.

The crimping portion 300C is positioned on the upper portion of the beading portion 300B, indicates a portion for wrapping the cap assembly 400, and is used to stably combine the cap assembly 400. One end of the upper portion of the battery case 300 may be bent to wrap the cap assembly 400 and form a crimping portion 300C. In detail, the one end of the upper portion of the battery case 300 may be bent to wrap the exterior circumference of the safety vent 410 and form the crimping portion 300C.

A sealing gasket 700 may be installed in the crimping portion 300C and the beading portion 300B to increase the sealing force between the cap assembly 400 and the battery case 300. The gasket 700 may intercept the electrical connection between the cap assembly 400 and the battery case 300. The gasket 700 is positioned between the battery case 300 and the cap assembly 400, and the one end of the upper portion of the battery case 300 may be bent to perform crimping-combination and form the crimping portion 300C. That is, by the crimping-combination, the cap assembly 400 may be installed, the rechargeable battery 100 may be sealed, and the battery case 300 may be insulated from the cap assembly 400. The gasket 700 may be positioned between the crimping portion 300C and the safety vent 410.

A curved portion 410B may be formed on the safety vent 410. In detail, as shown in FIG. 4 and FIG. 5, one portion of the safety vent 410 may be bent upward to form a curved portion 410B. As the curved portion 410B is formed, transformation transferred to the safety vent 410 may be reduced at the time of crimping-combination. Further, as described above, as the shape of the safety vent 410 is reversed in an abnormal operation state, the first portion 421 of the CID filter 420 is also lifted so that the first portion 421 of the CID filter 420 and the second portion 422 are separated from each other. The flow of current is intercepted according to this, and it is desirable to form an interval between the safety vent

410 and the CID filter 420 so as to efficiently block the flow of current. Hence, a curved portion 410B bent upward may be formed to increase the interval between the safety vent 410 and the CID filter 420 while minimizing the height of the cap assembly 400.

In the case of the above-described crimping-combination, strong physical compression may be applied to the cap assembly 400, and the cap assembly 400 may thus be damaged. Particularly, the safety vent 410 may be damaged in the structure in which the safety vent 410 is exposed without the upper cap in a like way of the present embodiment. When the safety vent 410 is made thicker than the prior art so as to supplement the rigidity of the safety vent 410, reversal of the shape of the safety vent 410 or separation thereof may not be accurately realized when the internal pressure increases.

Regarding the cap assembly according to the present embodiment, the thickness of the safety vent 410 is not simply increased, but a curling part 410C may be provided on a portion that corresponds to the crimping portion 300C from among the safety vent 410. In detail, the safety vent 410 may include the curling part 410C that is bent on the exterior circumference of the safety vent 410. For ease of description, FIG. 3 and FIG. 4 show a flange part 410F before a curling part 410C is formed, and FIG. 5 shows that a flange part 410F is bent inward to form a curling part 410C.

The crimping portion 300C of the battery case 300 may wrap the safety vent 410 with the gasket 700 therebetween, and in detail, it may wrap the curling part 410C of the safety vent 410 and may achieve crimping-combination. A center portion of the safety vent 410 is made as a single layer, and the exterior circumference of the safety vent 410 wrapped by the crimping portion 300C may be made as double layers. That is, as the curling part 410C is provided, the damage of the safety vent 410 generated at the time of crimping-combination may be prevented, and the reversal or separation of the shape of the safety vent 410 is not hindered when the internal pressure increases.

A method for manufacturing a rechargeable battery according to an embodiment of the present invention will now be described with reference to FIG. 9 to FIG. 15. No repeated portions of the above-described content will be provided.

FIG. 9 to FIG. 15 show cross-sectional views of a method for manufacturing a rechargeable battery according to an embodiment of the present invention. In detail, the cross-sections of the upper portion of the rechargeable battery are shown.

Referring to FIG. 3, FIG. 4, and FIG. 9, the method for manufacturing a rechargeable battery includes receiving the electrode assembly 200 in the battery case 300 with an opened upper portion, and combining the cap assembly 400 including the safety vent 410 and the CID filter 420 on the opened upper portion of the battery case 300. In this instance, as described above, the electrode assembly 200 may have a jelly-roll shape in which the first electrode 210, the second electrode 220, and the separation membrane 230 are wound, and the battery case 300 may be a cylindrical case. The electrolyte solution may be injected into the battery case 300 together with the electrode assembly 200 before combining the cap assembly 400.

The safety vent 410 of the cap assembly 400 is exposed to the outside at the upper portion, a vent hole 410H is formed in the safety vent 410, and a CID hole 420H is formed in the CID filter 420. Detailed structures of the safety vent 410 and the CID filter 420 correspond to what have been already described so they will be omitted.

Referring to FIG. 5 and FIG. 6, when the cap assembly 400 is disposed, the first electrode tab 213 extending from the electrode assembly 200 is bonded to the lower side of the CID filter 420 while the CID hole 420H is closed. Here, as described above, the first electrode tab 213 may include an upper tab portion 213*a* and a lower tab portion 213*b*.

In the combining of the cap assembly 400, the upper tab portion 213*a* is closely attached to the lower side of the CID filter 420, and the second end of the upper tab portion 213*a* is moved to close the CID hole 420H. The first end of the upper tab portion 213*a* is welded and bonded to the lower side of the CID filter 420. In other words, the second end of the upper tab portion 213*a* is closely attached to the lower side of the CID filter 420 including the CID hole 420H and finishes the CID hole 420H, and the first end of the upper tab portion 213*a* is welded to the CID filter 420. In this form, the CID filter 420 is connected to the first electrode tab 213. Particularly, the first electrode tab 213 has an elastic force in the direction of the CID hole 420H so the CID hole 420H is maintained to be in the closed state.

As shown in FIG. 7, when a protrusion 213*a*-1 is formed on the upper tab portion 213*a* of the first electrode tab 213, the protrusion 213*a*-1 may be inserted into the CID hole 420H while the CID filter 420 is connected to the first electrode tab 213.

Referring to FIG. 9 and FIG. 10, the combining of a cap assembly 400 may include forming a crimping portion 300C for wrapping the safety vent 410 by bending the one end 300U of the upper portion of the battery case 300. In detail, the gasket 700 is positioned between the safety vent 410 of the cap assembly 400 and the battery case 300, and the one end 300U of the upper portion of the battery case 300 may be bent to perform crimping-combination.

In this instance, the safety vent 410 may include a curling part 410C bent at the exterior circumference of the safety vent 410, and a crimping-combination may be performed so that the crimping portion 300C may wrap the curling part 410C. The curling part 410C may be formed by bending the flange part 410F (refer to FIG. 4) facing up, inward.

Referring to FIG. 10, the method for manufacturing a rechargeable battery according to the present embodiment includes activating the electrode assembly 200 to thus perform an activation stage. While the first electrode tab 213 closes the CID hole 420H, the activation may be performed by repeating charging and discharging with a constant current or a constant voltage within a predetermined range. The activation stage represents a process for repeating charging and discharging to form a solid electrolyte interface (SEI) film on the negative electrode surface and select a low voltage. The charging and discharging may be repeated by applying a constant current or a constant voltage to the safety vent 410 functioning as an electrode terminal and the battery case 300. For the activation stage, gas is generated in the battery case 300 according to a mutual reaction of the electrode assembly and the electrolyte solution, and the gas is accumulated in the battery case 300 and increases pressures.

Referring to FIG. 11, the method for manufacturing a rechargeable battery according to the present embodiment includes discharging the gas generated in the activation stage to the outside through the vent hole 410H formed in the safety vent 410 and the CID hole 420H formed in the CID filter 420 to thus discharge gas. In detail, in the gas discharging stage, the first electrode tab 213 is pressed downward through the vent hole 410H and the CID hole

420H to open the CID hole 420H, and the gas is discharged to the outside through the CID hole 420H and the vent hole 410H. The upper tab portion 213*a* is pressed from among the first electrode tab 213.

In the gas discharging stage, a bar member 1000 is inserted through the vent hole 410H and the CID hole 420H to press the first electrode tab 213 downward. In a like way, the bar member 1000 may press the upper tab portion 213*a* downward from among the first electrode tab 213. The CID hole 420H is opened and the gas generated in the battery case 300 is discharged to the outside through the CID hole 420H and the vent hole 410H.

Particularly, as the upper cap is removed from the rechargeable battery 100, it is easy to allow the bar member 1000 to pass through the vent hole 410H and the CID hole 420H. In other words, the first electrode tab 213 may be pressed by inserting the bar without damaging the vent hole 410H and the CID hole 420H. As the upper cap is removed, the gas may be discharged fluently.

Referring to FIG. 12, the method for manufacturing a rechargeable battery according to a modified embodiment may include discharging gas by use of an suction device 1100. In detail, not the bar member 1000 shown in FIG. 11 but an additional suction device 1100 may be inserted through the vent hole 410H and the CID hole 420H to press the upper tab portion 213*a* of the first electrode tab 213 downward. While the CID hole 420H is opened, the suction device 1100 may remove the gas in the battery case 300. Compared to the case of inserting the bar member 1000, the gas in the battery case 300 may be more efficiently removed.

Referring to FIG. 13, after the gas is discharged, the force applied to press the first electrode tab 213 is removed, the first electrode tab 213 may be returned to the original position, and the CID hole 420H may be closed again. The removal of the force pressing the first electrode tab 213 signifies removing of the bar member 1000 or the suction device 1100. The gas discharging ends when the CID hole 420H is closed.

The method for manufacturing a rechargeable battery according to the present embodiment may further include, after the gas discharging, welding a lower portion of the interior circumference of the CID hole 420H and the first electrode tab 213 to thus performing welding. In detail, an additional welding device (not shown) is inserted to pass through the vent hole 410H and the CID hole 420H, and weld the lower portion of the interior circumference of the CID hole 420H to the first electrode tab 213. FIG. 13 shows a formation of the bonded portion W on a corresponding portion by welding. Particularly, while the upper tab portion 213*a* is closely attached to the CID hole 420H, the upper tab portion 213*a* and the interior circumference of the CID hole 420H are welded to seal a gap between the CID filter 420 and the first electrode tab 213. By this, the CID hole 420H may be primarily sealed after the gas discharging stage.

Referring to FIG. 14, the method for manufacturing a rechargeable battery according to the present embodiment may further include inserting the sealing ball 500 into the CID hole 420H through the vent hole 410H to thus perform a sealing ball inserting stage. In the sealing ball inserting stage, the sealing ball 500 may be inserted into the CID hole 420H according to a forcibly inserting method. By this, the CID hole 420H may be efficiently sealed. In detail, the sealing ball 500 may be bonded to the CID hole 420H by a ball welding method. The CID hole 420H may be a circular via-hole, and the sealing ball 500 may have a cylindrical or spherical shape. The sealing ball 500 may be strongly shot to the CID hole 420H, and the sealing ball 500 may be inserted into the CID hole 420H.

Referring to FIG. 15, the method for manufacturing a rechargeable battery according to the present embodiment may further include fusing the sealing ball 500 inserted into the CID hole 420H. In detail, the fusing device 1200 may be inserted through the vent hole 410H and heat may be applied to the sealing ball 500. Accordingly, the partly fused sealing ball 500 is bonded to the interior circumference of the CID hole 420H. The CID hole 420H may then be completely sealed.

In the activation stage, a large amount of gas is generated according to formation of an electrode film or decomposition of moisture in the cell, and the gas generated for the activation process has a large amount and continuously reacts to the electrode film, so a process for discharging it is needed. As described above, the rechargeable battery 100 manufactured according to an embodiment of the present invention discharges the gas generated in the activation stage and is finally sealed so the problem of expansion or transformation of the electrode assembly according to remaining gas or the problem of causing precipitation of lithium according to remaining gas foam may be solved.

Terms representing directions such as before, after, right, left, top, and bottom have been used, but they are for ease of description, and are variable depending on a position of a target material or a position of an observer.

A plurality of the above-described rechargeable battery according to the present embodiment may configure a battery module. The battery module may be installed together with various controlling and protecting systems such as a battery management system (BMS) or a cooling system and may configure a battery pack.

The rechargeable battery, the battery module, or the battery pack are applicable to various types of devices. In detail, they may be applied to transportation means such as electric bicycles, electric vehicles, hybrid vehicles, and energy storage systems (ESS), but are not limited thereto, and may be applied to various devices that can use the rechargeable battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: rechargeable battery
200: electrode assembly
300: battery case
400: cap assembly
410: safety vent
410H: vent hole
420: CID filter
420H: CID hole

The invention claimed is:

1. A rechargeable battery comprising:
an electrode assembly having a first electrode tab extending therefrom;
a battery case configured to receive the electrode assembly therein, the battery case having an opened upper portion; and
a cap assembly connected to the opened upper portion of the battery case, the cap assembly including:

a safety vent exposed to an outside of the rechargeable battery at the opened upper portion of the battery case, the safety vent having a vent hole; and
a current interrupt device (CID) filter located below the safety vent, the CID filter having a CID hole connected to the vent hole,
wherein the first electrode tab is connected to the CID filter, and
wherein the CID hole is closed or opened by movement of the first electrode tab.

2. The rechargeable battery of claim 1, wherein the vent hole and the CID hole are disposed on a same line, and
wherein, when the first electrode tab closes the CID hole, the first electrode tab is exposed to the outside of the rechargeable battery through the vent hole and the CID hole.

3. The rechargeable battery of claim 1, wherein the vent hole has a diameter that is greater than a diameter of the CID hole.

4. The rechargeable battery of claim 1, wherein the first electrode tab includes an upper tab portion and a lower tab portion connected to the upper tab portion,
wherein the lower tab portion is connected to the electrode assembly, and
wherein a first end of the upper tab portion connected to the lower tab portion is connected to the CID filter.

5. The rechargeable battery of claim 4, wherein a second end of the upper tab portion is in contact with or spaced from a lower side of the CID filter to close or open the CID hole.

6. The rechargeable battery of claim 5, wherein the first electrode tab includes a material with an elastic restoration force.

7. The rechargeable battery of claim 4, wherein a lower portion of an interior circumference of the CID hole is welded to the upper tab portion.

8. The rechargeable battery of claim 1, wherein the first electrode tab includes a protrusion inserted into the CID hole.

9. The rechargeable battery of claim 1, further comprising a sealing ball inserted into the CID hole.

10. The rechargeable battery of claim 1, wherein one end of the opened upper portion of the battery case is bent to wrap an exterior circumference of the safety vent to form a crimping portion.

11. A method for manufacturing a rechargeable battery, comprising:
receiving an electrode assembly into a battery case with an opened upper portion of the battery case, the electrode assembly having a first electrode tab extending therefrom;
connecting a cap assembly having a safety vent and a current interrupt device (CID) filter to the opened upper portion of the battery case;
activating the electrode assembly; and
discharging gas generated by the activating the electrode assembly to an outside of the rechargeable battery through a vent hole in the safety vent and a CID hole in the CID filter,
wherein the safety vent is exposed to the outside of the rechargeable battery at the opened upper portion of the battery case,
wherein the first electrode tab is connected to the CID filter while the CID hole is closed by the first electrode tab, and
wherein, during the discharging the gas, the first electrode tab is pressed downward via the vent hole and the CID hole to open the CID hole so the gas is discharged to the outside of the rechargeable battery through the CID hole and the vent hole.

12. The method of claim 11, wherein, during the discharging the gas, a bar member or a suction device is inserted through the vent hole and the CID hole to press the first electrode tab downward.

13. The method of claim 11, wherein, after the discharging the gas, a force pressing the first electrode tab is removed, and the first electrode tab is returned to an original position to close the CID hole again.

14. The method of claim 11, further comprising, after the discharging the gas, welding a lower portion of the interior circumference of the CID hole and the first electrode tab.

15. The method of claim 11, further comprising, after the discharging the gas, inserting a sealing ball into the CID hole through the vent hole to seal the CID hole.

16. The method of claim 15, further comprising fusing the sealing ball inserted into the CID hole.

* * * * *